(12) United States Patent
Rink et al.

(10) Patent No.: US 6,746,046 B2
(45) Date of Patent: Jun. 8, 2004

(54) DUAL FLOW INFLATOR FOR A VEHICULAR AIRBAG SYSTEM

(75) Inventors: Karl K. Rink, Princeton, ID (US); David J. Green, Brigham City, UT (US); Anthony M. Young, Malad, ID (US); C. Paul Dinsdale, Farr West, UT (US)

(73) Assignee: Autoliv ASP, Inc., Ogden, UT (US)

( * ) Notice: Subject to any disclaimer, the term of this patent is extended or adjusted under 35 U.S.C. 154(b) by 28 days.

(21) Appl. No.: 10/100,820

(22) Filed: Mar. 19, 2002

(65) Prior Publication Data

US 2003/0178828 A1 Sep. 25, 2003

(51) Int. Cl.[7] ............................................. B60R 21/26
(52) U.S. Cl. ..................... 280/737; 280/741; 137/68.13
(58) Field of Search ............................ 280/737, 736, 280/741, 742, 728.2, 730.2, 729; 102/530, 531; 137/68.13

(56) References Cited

U.S. PATENT DOCUMENTS

| | | | |
|---|---|---|---|
| 3,961,806 A | | 6/1976 | Katter |
| 5,225,940 A | | 7/1993 | Ishii et al. ................... 359/823 |
| 5,273,309 A | * | 12/1993 | Lau et al. .................. 280/730.2 |
| 5,593,180 A | | 1/1997 | Cuevas et al. ............... 280/741 |
| 5,630,619 A | | 5/1997 | Buchanan et al. ........... 280/741 |
| 5,660,412 A | * | 8/1997 | Renfroe et al. .............. 280/737 |
| 5,709,406 A | | 1/1998 | Buchanan ................... 280/737 |
| 5,762,369 A | | 6/1998 | Mooney et al. ............. 280/741 |
| 5,779,269 A | | 7/1998 | Moore et al. |
| 5,794,973 A | | 8/1998 | O'Loughlin et al. |
| 5,820,161 A | | 10/1998 | Svensson ................... 280/737 |
| 5,951,043 A | | 9/1999 | Mooney et al. ............. 280/741 |
| 5,992,881 A | | 11/1999 | Faigle |
| 6,010,152 A | | 1/2000 | Swann et al. |
| 6,056,319 A | | 5/2000 | Ruckdeschel et al. |
| 6,062,599 A | | 5/2000 | Forbes et al. |
| 6,073,961 A | * | 6/2000 | Bailey et al. ............. 280/730.2 |
| 6,086,094 A | | 7/2000 | Stevens et al. |
| 6,095,561 A | | 8/2000 | Siddiqui et al. |
| 6,206,412 B1 | | 3/2001 | Swann et al. |
| 6,254,124 B1 | | 7/2001 | Angermaier |
| 6,293,581 B1 | * | 9/2001 | Saita et al. ............... 280/730.2 |
| 6,390,499 B1 | * | 5/2002 | Leitner et al. .............. 280/736 |
| 6,390,502 B1 | | 5/2002 | Ryan et al. |
| 6,557,902 B1 | | 5/2003 | Einsiedel et al. |
| 6,572,141 B2 | | 6/2003 | Nanbu |
| 2001/0038199 A1 | * | 11/2001 | Fischer .................... 280/730.2 |
| 2001/0048218 A1 | * | 12/2001 | Whang et al. .............. 280/737 |
| 2003/0042719 A1 | * | 3/2003 | Rink et al. ................. 280/736 |

FOREIGN PATENT DOCUMENTS

| | | | | |
|---|---|---|---|---|
| DE | 19701663 | | 7/1998 | ........... B60R/21/26 |
| JP | 2000-296751 | | 10/2000 | ........... B60R/21/22 |
| WO | WO99/32334 | | 7/1999 | ........... B60R/21/26 |

* cited by examiner

Primary Examiner—Peter C. English
(74) Attorney, Agent, or Firm—Sally J. Brown (57) ABSTRACT

A dual flow inflator for airbags is disclosed, together with related manufacturing, installation, and deployment methods. The inflator may have a gas chamber with a first end with a first exit orifice and a second end with a second exit orifice. The exit orifices may be directed into inlet ports of an inflatable curtain so that inflation gases exit the inflator through the exit orifices and enter directly into the inflatable curtain. The exit orifices may provide axial gas flows in opposite directions so that each gas flow neutralizes the thrust of the other. The exit orifices may comprise frangible structures such as burst discs, scored surfaces, and compression closures. If desired, pistons may be utilized to ensure that the exit orifices are completely and simultaneously opened. Furthermore, the gas chamber may comprise a variety of configurations, including a unitary, one-piece structure, a multi-part structure with vessels attached to a tubular or spherical bulkhead, or a generally spherical shape.

59 Claims, 5 Drawing Sheets

DUAL FLOW INFLATOR FOR A VEHICULAR AIRBAG SYSTEM

BACKGROUND OF THE INVENTION

1. Field of the Invention

The present invention relates to systems and methods for protecting vehicle occupants from injury. More specifically, the present invention relates to a dual flow inflator that injects multiple gas flows into an airbag system, such as an inflatable curtain.

2. Description of Related Art

The inclusion of inflatable safety restraint devices, or airbags, is now a legal requirement for many new vehicles. Airbags are typically installed in the steering wheel and in the dashboard on the passenger side of a car. In the event of an accident, an accelerometer within the vehicle measures the abnormal deceleration and triggers the expulsion of rapidly expanding gases from an inflator. The expanding gases fill the airbags, which immediately inflate in front of the driver and passenger to protect them from impact against the windshield. Side impact airbags, known as inflatable curtains, have also been developed in response to the need for protection from impacts in a lateral direction, or against the side of the vehicle. An inflatable curtain may have one or more separately inflated cushions.

Side impact cushions are often designed to unfold or unroll downward to inflate beside a person to keep the person from hitting the door or window during lateral impact. Since a vehicle occupant may be leaning forward, reclined in the seat, or at any position between, such cushions are often made somewhat long to ensure that the occupant hits the cushion. If multiple cushions are fed by a single inflator positioned either fore or aft of the cushions, an especially long gas flow path exists between the inflator and the cushion furthest from the inflator. Thus, the outermost extents of the inflatable curtain may receive insufficient inflation gas pressure to inflate to the optimal protective pressure.

Even with somewhat shorter cushions, rapid and even inflation can be difficult to achieve with known inflator designs. Many existing inflators eject inflation gases outward radially; consequently, the inflation gases are not propelled along the length of the cushion, but are directed into the cushion near the inflator. The outer regions of the cushion are still inflated later than those closest to the inflator.

Additionally, some inflatable curtain systems are somewhat expensive due to the need for multiple inflators, attachment mechanisms, and the like. Many inflatable curtain systems require the use of a gas conduit that conveys gas from the inflator to the inflatable curtain. Some known inflators require the use of multiple initiators that add to the manufacturing expense and timing requirements of the inflator.

Furthermore, many inflators produce thrust upon activation. As a result, somewhat complex attachment mechanisms must often be used to affix the inflators to the vehicle to ensure that the inflators do not dislodge themselves during deployment. Such additional parts increase the cost of the inflatable curtain system, as well as the time and expense required to install the inflatable curtain system in a vehicle.

Accordingly, a need exists for an inflator and related methods that remedy the problems found in the prior art. Such an inflator should preferably provide relatively even and rapid inflation of the associated inflatable curtain, preferably without requiring multiple inflators for a single curtain. Such an inflator should also preferably be simple and inexpensive to manufacture and install.

SUMMARY OF THE INVENTION

The apparatus of the present invention has been developed in response to the present state of the art, and in particular, in response to the problems and needs in the art that have not yet been fully solved by currently available inflators. Thus, it is an overall objective of the present invention to provide an inflator and related systems and methods that provides rapid, even inflation with a minimum of manufacturing and installation cost.

To achieve the foregoing objective, and in accordance with the invention as embodied and broadly described herein in the preferred embodiment, a dual flow inflator is provided. According to one configuration, the inflator may comprise a gas chamber with a first end disposed within a first inlet port of the inflatable curtain and a second end disposed within a second inlet port of the inflatable curtain. The gas chamber may comprise one unitary body. The first and second inlet ports may be tightly affixed to the gas chamber such that gas is unable to escape from the inflatable curtain between the inlet ports and the gas chamber.

The gas chamber may have a first exit orifice positioned at the first end and a second exit orifice positioned at the second end. Each exit orifice may have a sealed configuration that does not permit gas flow, and an open configuration, in which inflation gases flow relatively freely out of the gas chamber through the exit orifice. Each exit orifice may take the form of a diffuser that forms an interior wall with an opening covered by a burst disc; the burst discs may be removed from the openings via a pressure shock induced by combustion within the gas chamber. Burst disc retention members may be disposed outside the openings to capture the burst discs and ensure that they do not damage the inflatable curtains.

Each exit orifice may also have a gas guide diffuser disposed outside the opening to control the flow of inflation gas out of the exit orifice. The gas guide diffusers may be aligned with the longitudinal axis of the inflator so that inflation gases are ejected along the longitudinal axis. The gas guide diffusers of the first and second orifices may be directed opposite to each other so that thrust from the first exit orifice substantially negates the thrust from the second exit orifice, and vice versa.

The inflator may have an initiator disposed near or partially within the gas chamber to activate a gas-producing material to create first and second gas flows through the first and second exit orifices, respectively. The gas-producing material may be a liquid/gas mixture that has been cryogenically inserted into the gas chamber in solid form. Whether cryogenic or standard gas-producing material is used, the gas-producing material may be inserted into the inflator through a sealable fill port or into the interior of the inflator prior to assembly of the inflator components. The initiator may heat the liquid/gas mixture to cause the pressure shock that removes the burst discs from the openings, thereby moving the first and second exit orifices into the open configuration.

According to one alternative embodiment, an inflator may comprise a gas chamber constructed of multiple parts. The gas chamber may have two vessels and a bulkhead. Each of the vessels may have a generally tubular shape with an interior end and an exterior end. The bulkhead may also have a tubular shape with two apertures designed to be aligned with the interior ends of the vessels. The vessels may be affixed to the bulkhead through a method such as welding. First and second exit orifices may be disposed on the exterior ends of the first and second vessels, respectively.

In place of the openings and burst discs of the first embodiment, the first and second exit orifices of the second embodiment may take the form of scored, or notched, surfaces that open when the pressure within the gas chamber exceeds the tear strength of the scored regions. The scored surface may open to form a suitable exit nozzle.

As with the previous embodiment, a gas-producing material such as a compressed gas and liquid mixture may be thermally activated by an initiator to provide first and second gas flows through the first and second exit orifices, respectively. In order to ensure that both scored surfaces burst completely and simultaneously, two pistons may be positioned within the gas chamber on either side of the initiator. When the gas-producing material between the pistons expands, the increasing pressure drives the pistons outward, toward the exit orifices. The result is an increase in the pressure between the pistons and the exit orifices; this pressure increase induces failure of the scored regions to open the first and second exit orifices.

According to another alternative, the inflator may comprise a gas chamber with two vessels affixed to a generally spherical bulkhead. Each vessel may have an exit orifice that takes the form of a compression closure, such as a crimped opening. The crimped opening may have two lips pressed flat together and attached through a method such as welding. As with the scored region, the crimped opening opens in response to a pressure increase within the gas chamber. In the alternative, some physical puncture mechanism may be used to open the crimped opening when activated by the initiator.

More specifically, the inflator may have pistons like those described in connection with the previous embodiment. Each of the pistons may have a puncture member designed to impact the associated exit orifice, thereby opening the lips to permit escape of the pressurized inflation gases.

In yet another embodiment, the entire gas chamber may have a generally spherical shape. The gas chamber may be made from two hemispherical portions attached together. Each hemispherical portion may have an exit orifice; the exit orifices may be positioned opposite each other to permit the inflation gases to flow out from the gas chamber in opposite directions. The exit orifices may take the form of openings with burst discs, as in the first embodiment.

Through the use of the inflators of the present invention, cost savings may be obtained through the elimination of gas conduits, complex attachment features, and redundant inflators and initiators. Additionally, more rapid and even inflation of the inflatable curtains may be obtained. As a result, the availability and effectiveness of vehicular airbag systems may be enhanced.

These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 5, is not intended to limit the scope of the invention, as claimed, but is merely representative of presently preferred embodiments of the invention.

The present invention provides an apparatus and method whereby problems associated with previously known inflators can be resolved. More specifically, through the use of counterbalancing axial flows, a thrust neutral design may be obtained, thereby eliminating the complexity of axially supported inflator mounting. Furthermore, a single-initiator configuration provides simplicity of manufacturing and activation.

Yet further, inflation gas can be simultaneously injected into multiple inlet ports in an inflatable curtain to enhance the speed of curtain deployment. Through the use of axial flow, inflation gas can be injected away from exit orifices of the inflator. Hence, the inflatable curtain deploys more evenly to provide better occupant protection. The manner in which these principles are utilized in the present invention will be shown and described in greater detail in the following discussion.

Figure 1:
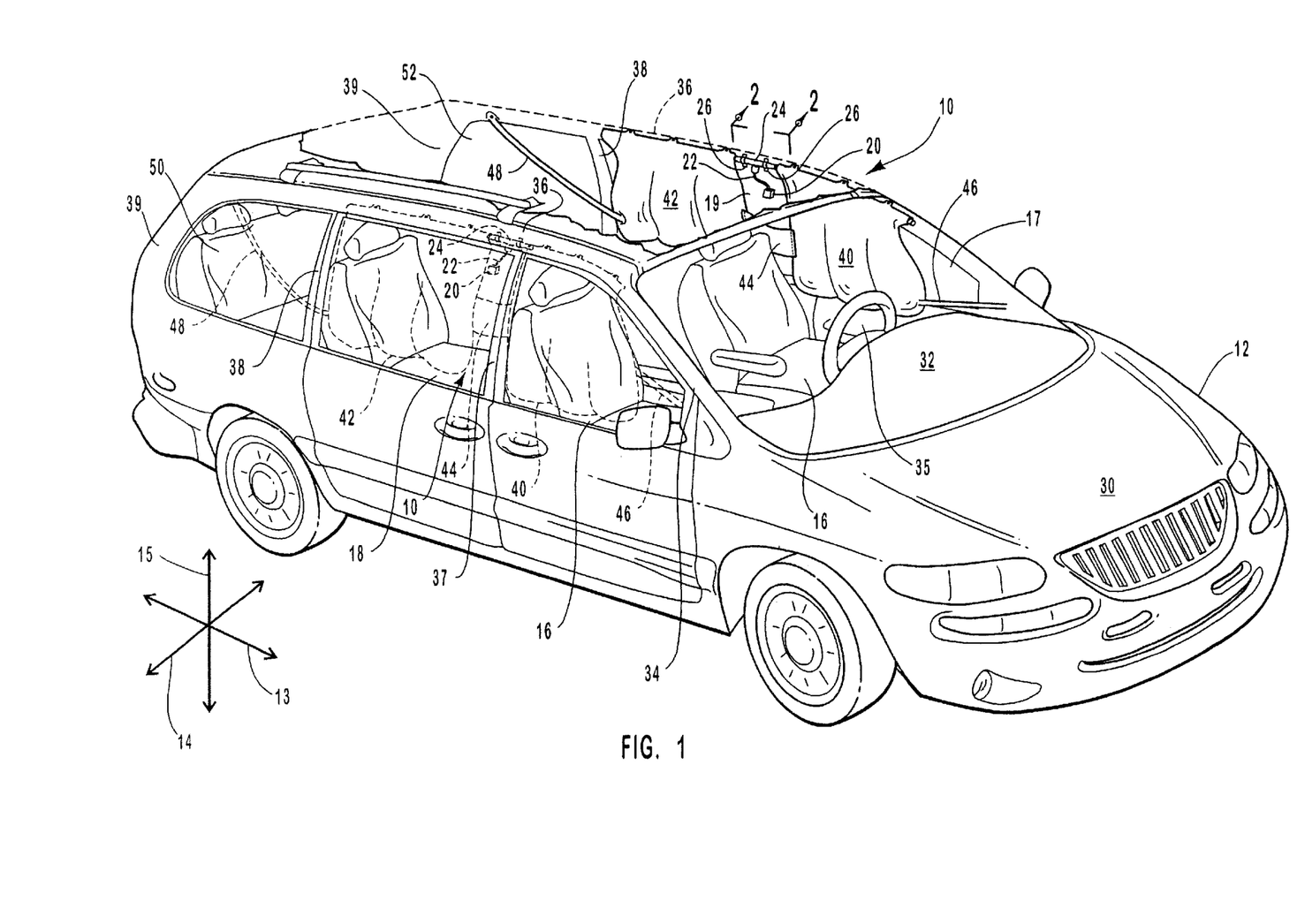
FIG. 1 is a perspective view of a vehicle with an inflatable curtain that incorporates one embodiment of an inflator according to the invention.

Referring to FIG. 1, an inflatable curtain 10 according to one possible embodiment the invention is shown installed in a vehicle 12. The inflatable curtain 10 may form part of an airbag system configured to protect one or more vehicle occupants against lateral impact through the formation of a protective curtain beside the occupants.

The vehicle 12 has a longitudinal direction 13, a lateral direction 14, and a transverse direction 15. The vehicle 12 further has front seats 16 laterally displaced from first lateral surfaces 17, or front doors 17, as shown in the vehicle 12 of FIG. 1. The vehicle 12 also has rear seats 18 laterally displaced from second lateral surfaces 19, or rear doors 19, as depicted. As shown, two such inflatable curtains 10 may be used: one for the driver's side of the vehicle 12, and the other for the passenger's side.

One or more accelerometers 20 or other similar impact sensing devices detect sudden lateral acceleration (or deceleration) of the vehicle 12 and transmit electric signals via electric lines 22 to one or more inflators 24 that provide pressurized gas to inflate the inflatable curtains 10. As shown in FIG. 1, a single inflator 24 maybe used to inflate each of the inflatable curtains 10. The inflators 24 may be affixed to the vehicle 12 through the use of relatively simple mounting brackets 26.

The inflators 24 may be positioned approximately midway along the longitudinal length of the inflatable curtains 10 to provide relatively rapid and even inflation, in a manner that will be described in greater detail subsequently. Of course, the position and attachment of the inflators 24 may be varied in a number of ways from the configuration depicted in FIG. 1.

Each of the inflators 24 may take the form of a hollow pressure vessel containing a chemically reactive material and/or compressed gas including liquid forms thereof that can be activated or released upon application of electricity to provide an outflow of inflation gases. In the exemplary configuration of FIG. 1, the inflators 24 are partially enveloped within the inflatable curtains 10 so that inflation gases exiting the inflators 24 flow directly into the inflatable curtains 10. The inflators 24 may operate with such rapidity that, before the vehicle 12 has fully reacted to the impact, the inflatable curtains 10 have inflated to protect vehicle occupants from impact.

Optionally, the accelerometers 20 may be stowed within an engine compartment 30 or dashboard 32 of the vehicle 12. A controller (not shown) may also be used to process the output from the accelerometer 20 and control various other aspects of a vehicle safety system of the vehicle 12. If the accelerometers 20 are remotely positioned, the electric line 22 and/or other control wiring may be disposed along the A pillars 34 of the vehicle 12, on either side of the windshield 35, to reach the inflators 24. Alternatively, each accelerometer 20 may be positioned near one of the inflators 24, as shown in FIG. 1.

The inflators 24 and the inflatable curtains 10 may be attached to roof rails 36 of the vehicle 12. Depending on the model of the vehicle 12 and the desired configuration of the inflatable curtains 10, airbag components may also be disposed along the B pillars 37, C pillars 38, and/or D pillars 39.

The inflatable curtains 10 shown in FIG. 1 are configured to protect not only occupants of the front seats 16, but those of the rear seats 18 as well. Thus, each inflatable curtain 10 may have a first protection zone 40 configured to inflate between the front seats 16 and one of the front doors 17, and a second protection zone 42 configured to inflate between the rear seats 18 and one of the rear doors 19. The first and second protection zones 40, 42 may be essentially separate, and may be in fluid communication with each other only through the inflators 24. In the alternative, the first and second protection zones 40, 42 may have an alternative flow path through which fluid can pass between the first and second protection zones 40, 42, even when gas is not able to flow through the inflator 24 between the first and second protection zones 40, 42.

The first and second protection zones 40, 42 of each inflatable curtain 10 may be attached together through the use of a connection zone 44 positioned between the protection zones 40, 42. The connection zone 44 may provide a flow path through which gases can flow between the first and second protection zones 40, 42, or may simply convey tension between the first and second protection zones 40, 42 to keep the first and second protection zones 40, 42 in place.

Each of the inflatable curtains 10 may have a front tether 46 attached to the A pillar 34 and a rear tether 48 attached to the roof rail 36 to exert tension on the inflatable curtains 10 to keep them in place during inflation and impact. Those of skill in the art will recognize that the tethers 46, 48 may also be attached to other parts of the vehicle 12, such as the B pillars 37, C pillars 38, and/or D pillars 39. The tethers 46, 48 may be constructed of standard seatbelt webbing or the like.

Although each inflatable curtain 10 in FIG. 1 has two protection zones 40, 42, the invention encompasses the use of inflatable curtains with any number of protection zones. Thus, if desired, each of the inflatable curtains 10 may be extended to have one or more protection zones positioned to protect occupants of extra seats 50 behind the rear seats 18 from impact against third lateral surfaces 52 of the vehicle 12. Additional inflators 24 may be used to inflate such additional protection zones.

The inflators 24 may be uniquely configured to provide rapid, even inflation as well as simple and inexpensive manufacturing and installation. The configuration of the inflator 24 will be described in greater detail in connection with FIG. 2.

Figure 2:
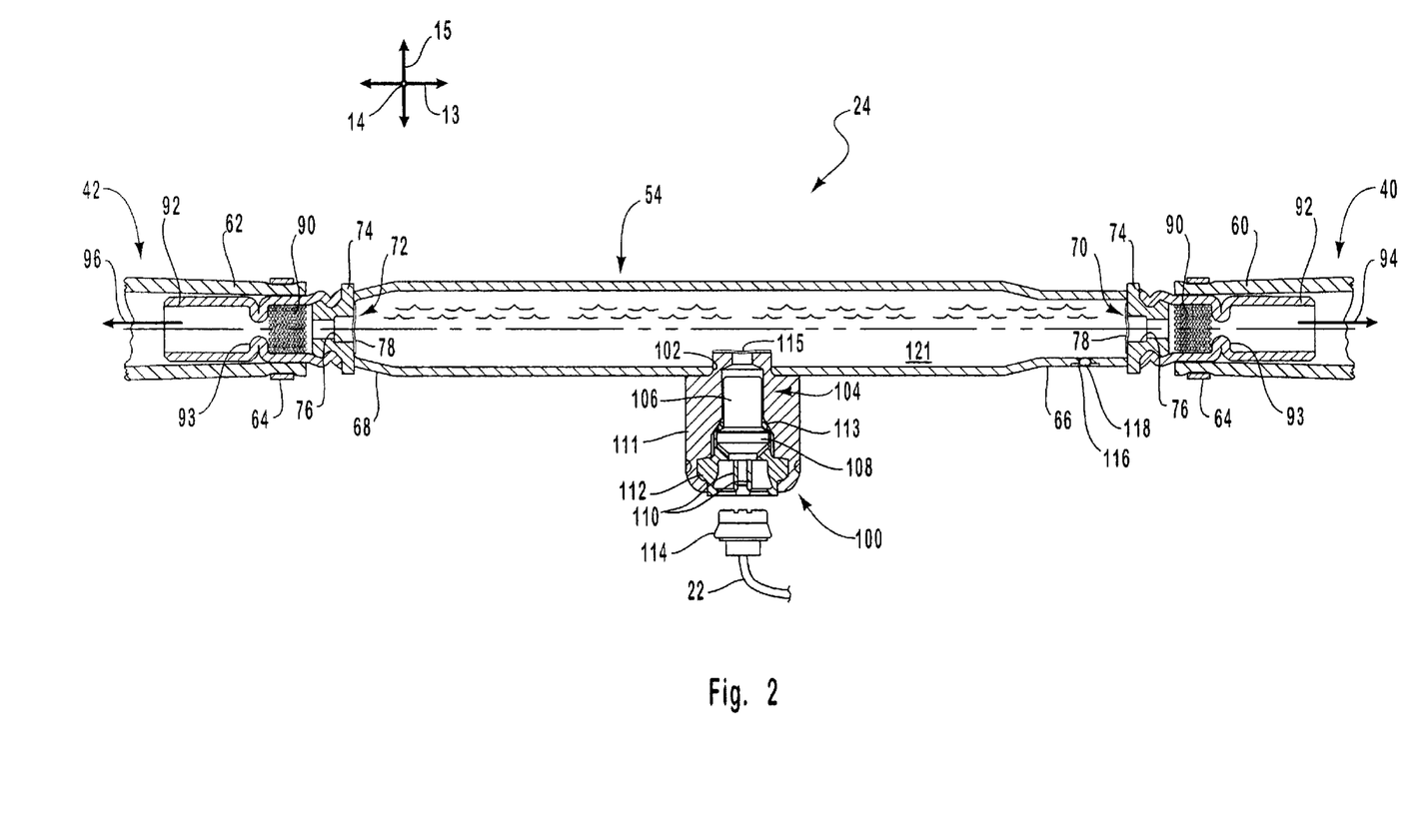
FIG. 2 is a side elevation, section view of the inflator of FIG. 1.

Referring to FIG. 2, a side elevation, cross sectional view of the inflator 24 is shown. The inflator 24 may have a gas chamber 54 formed of a material with a comparatively high tensile strength, such as steel. The gas chamber 54 may be formed of a single, unitary piece. In the alternative, the gas chamber 54 may be made from multiple pieces that are welded or otherwise attached together to provide the configuration shown in FIG. 2. The gas chamber 54 may have a generally tubular shape.

The inflator 24 may be positioned within a first inlet port 60 of the first protection zone 40 and a second inlet port 62 of the second protection zone 42 so that inflation gas leaving the gas chamber 54 directly enters the first and second protection zones 40, 42. Hence, a gas conduit is not required to channel the inflation gas from the inflator 24 to the inflatable curtain 10. The inflator 24 may simply be clamped in gas-tight fashion within the first and second inlet ports 60, 62, for example, through the use of ring-shaped clamps 64 that tightly press the fabric of the inlet ports 60, 62 against the surface of the inflator 24.

The dimensions of the gas chamber 54 may be varied to suit the volume in which the gas chamber 54 is to be installed. For example, the gas chamber 54 may be made longer than shown in the longitudinal direction 13 and/or thinner in the lateral and transverse directions 14, 15 to facilitate installation in a long, narrow space such as the space beside the roof rail 36. A longer gas chamber 54 may be installed such that the gas chamber 54 extends a significant distance into each protection zone 40, 42. Such installation may advantageously provide inflation gas flows that enter the inflatable curtain 10 about midway through each of the protection zones 40, 42 for more even inflation.

The gas chamber 54 may have a first end 66 disposed proximate the first inlet port 60 and a second end 68 disposed proximate the second inlet port 62. The first end 66 may have a first exit orifice 70, and the second end 68 may have a second exit orifice 72. Each of the first and second exit orifices 70, 72 has an open configuration, in which inflation gas can pass relatively freely through the exit orifices 70, 72, and a sealed configuration, in which substantially all inflation gasses are trapped within the gas chamber 54. Consequently, in this application, "exit orifice" refers to more than just a passageway; the structure that provides selective closure of the passageway is also included.

More precisely, each of the exit orifices 70, 72 may include a diffuser 74, which takes the form of a cap that seals the corresponding end 66 or 68 of the gas chamber 54. The diffusers 74 may each be unitary with the tubular body of the inflator 24, or may be separate caps that are welded or otherwise affixed to the body of the inflator 24. Each diffuser 74 may have an opening 76 against which a burst disc 78 is pressed by the pressure within the gas chamber 54. The burst discs 78 may have a wide variety of configurations; if desired, each of the burst discs 78 may have a slightly domed shape to provide a tight seal with the circular shape of the associated opening 76.

The burst discs 78 are preferably shaped to deflect under a pressure increase to uncover the openings 76. For example, the burst discs 78 may be made to bend enough to fit through the openings 76, so that the pressure increase ejects the burst discs 78 from the openings 76. The burst discs 78 may simply have a pressure threshold above which sufficient deformation occurs to push the burst discs 78 through the openings 76. Alternatively, the burst discs 78 may deform primarily in response to shock, or rapid pressure changes within the gas chamber 54.

Each of the openings 76 may have a counterbored shape with the larger portion disposed inward, toward the burst disc 78, and the narrower portion disposed outward. The larger portion may be sized to promote deflection and passage of the burst disc 78 through the opening 76 when the proper pressure or shock is achieved within the gas chamber 54. The narrower portion may serve as a flow restrictor to meter the flow of inflation gas from the opening 76. Depending on the configuration of the burst disc 78, the desired flow rate of inflation gas upon deployment, and other factors, the larger and narrower portions may be switched such that the larger portion is outwardly disposed and the smaller portion is inwardly disposed. Alternatively, the counterbore may be eliminated entirely in favor of an opening 76 of uniform diameter.

In order to prevent the ejected burst discs from damaging the inflatable curtain 10, the inflator 24 may also have a pair of burst disc retention members 90, each of which is disposed outside one of the exit orifices 70, 72. The burst disc retention members 90 may have a wide variety of configurations. As illustrated, the burst disc retention members 90 may take the form of cylindrical screens, through which inflation gases pass relatively freely. The screens may be formed of a mesh material, which may, for example, be obtained from the Metex Corporation of Edison, N. J. The burst discs 78 are simply captured by the burst disc retention members 90 after ejection from the openings 76. The burst discs 78 may remain in front of the openings 76, in which case inflation gases must simply flow around the burst discs 78 to exit the inflator 24.

The inflator 24 may also have a pair of gas guide diffusers 92 disposed outside the exit orifices 70, 72 and the burst disc retention members 90. Upon deployment of the inflator 24, a first gas flow 94 may exit the gas chamber 54 via the first exit orifice 70, and a second gas flow 96 may exit the gas chamber 54 via the second exit orifice 72. Each of the gas flows 94, 96 may then travel through the associated gas guide diffuser 92 to reach the corresponding inlet port 60, 62 of the inflatable curtain 10.

Each of the gas guide diffusers 92 may have a throat 93 that acts to retain the associated burst disc retention member 90. The throats 93 may also act as exit nozzles to pace the flow of inflation gas from the inflator 24. The throats 93 may be formed, for example, by crimping or otherwise compressing the generally tubular shapes of the gas guide diffusers 92.

As shown, the first and second gas flows 94, 96 travel in the longitudinal direction 13, along the longitudinal axis of the inflator 24. Provided the first and second gas flows 94, 96 are equal in momentum, i.e., the gas flows 94, 96 have an equal mass flow rate and an equal exit velocity, the thrust produced by each of the gas flows 94, 96 will neutralize that of the other. Hence, the inflator 24 will be subject to substantially no thrust in the longitudinal direction 13.

As a result, the inflator 24 may be attached to the vehicle 12 with only minimal support against axial motion of the inflator 24, or motion in the longitudinal direction 13. For example, the mounting brackets 26 depicted in FIG. 1 interfere directly with motion of the inflator 24 in the lateral and transverse directions 14, 15, but provide only frictional support against motion in the longitudinal direction 13. Such frictional support may be sufficient when a substantially thrust-neutral design, like that of FIG. 2, is utilized.

The inflator 24 may be comparatively easily installed in the vehicle 12 to obtain the configuration depicted in FIG. 1. For example, the gas guide diffuser 92 proximate the first end 66 of the gas chamber 54 may be inserted into the first inlet port 60, and the gas guide diffuser 92 proximate the second end 68 may be inserted into the second inlet port 62. The inflatable curtain 10 may then be attached to the roof rail 36 in the position shown in FIG. 1, and the inflator 24 may be attached to the roof rail 36 with the mounting brackets 26. The steps described above may be reordered in many ways to suit the particular configuration of the vehicle 12; for example, the inflator 24 may first be attached to the roof rail 36 with the mounting brackets 26, and the inlet ports 60, 62 may then be fitted around the gas guide diffusers 92. The inflatable cushion 10 may then be fixed in place.

Dual flow inflators according to the invention may alternatively be made in a non-thrust-neutral manner. For example, the openings 76 and/or the gas guide diffusers 92 of the first and second ends 66, 68 need not be equal in size, but may be sized differently to provide varying amounts of inflation gas. Such unequal flows may be desirable, for example, if the first and second protection zones 40, 42 were sized differently. In such a case, the thrust from one of the gas flows 94, 96 may only partially negate that of the other gas flow 94 or 96. Varying degrees of longitudinal support may be provided to account for such inequalities in thrust.

The gas guide diffusers 92 are optional; inflation gases may simply be allowed to freely escape the inflator 24 after traveling through the burst disc retention members 90. However, the gas guide diffusers 92 may beneficially provide more accurate direction of the first and second gas flows 94, 96, and hence more accurate direction of the thrust exerted by the escaping inflation gases on the inflator 24. The gas guide diffusers 92 may also increase the speed with which the first and second gas flows 94, 96 escape the inflator 24, so that the gas flows 94, 96 have the momentum to travel further into the inflatable curtain 10. Such rapid ejection may help to ensure that the portions of the inflatable curtain 10 that are furthest from the inflator 24 are adequately inflated prior to impact of the person against the inflatable curtain 10.

A dual flow inflator may be activated in a variety of ways to inflate the inflatable curtain 10. According to one embodiment, the first and second gas flows 94, 96 may both be triggered by the action of a single initiation assembly 100. The initiation assembly 100 may be affixed to one side of the inflator 24, and may communicate with the gas chamber 54 through an initiator aperture 102 of the gas chamber 54. The initiation assembly 100 may be disposed almost entirely outside the gas chamber 54.

The initiation assembly 100 may, for example, be laser welded in place to prevent the escape of inflation gases through the initiator aperture 102 or ejection of the initiation assembly 100 during deployment of the inflator 24. The initiation assembly 100 may be positioned halfway between the first and second exit orifices 70, 72 to ensure that the first and second gas flows 94, 96 are generated and expelled substantially simultaneously.

The initiation assembly 100 may have an initiator 104, which is an electrically-triggered pyrotechnic device. The initiator 104 may, for example, have a head 106 that contains pyrotechnic material, a body 108, and electrical prongs 110 through which the activation signal is received. The body 108 may be seated within an initiator receptacle 111, and may be held in place through the use of an initiator retention member 112. An o-ring 113 may be used to form a substantial seal between the initiator 104 and the initiator receptacle 111. The prongs 110 may be inserted into a plug 114 of the electric line 22 leading to the accelerometer 20. A burst disc 115 may be disposed on the initiator receptacle 111, within the gas chamber 54, to seal the initiator 104 from the interior of the gas chamber 54 until the inflator 24 has deployed. Upon deployment of the initiator 104, the burst disc 115 may be removed to expose the initiator 104 to the interior of the gas chamber 54.

The inflator 24 may have a fill port 116 through which gaseous, liquid, or even solid material can be inserted into the gas chamber 54. The fill port may be sealable through the use of a stopper 118, which may take the form of a metallic bead that can be pressed into the fill port 116 and welded in place.

The inflator 24 may be of any type, including pyrotechnic, compressed gas, and hybrid types. In the embodiment of FIG. 2, the inflator 24 may contain a gas-producing material 121 in a compressed state. The gas-producing material 121 may be substantially inert, i.e., non-reactive at the temperatures and pressures that occur during activation of the inflator 24. Due to the compression, a portion of the gas-producing material 121 may be in liquid form within the gas chamber 54.

Alternatively, the inflator 24 may be a pyrotechnic inflator, so that the gas-producing material 121 is not an inert compressed liquid, gas, or mixture, but takes the form of a combustible solid, gas, or liquid. The inflator 24 may also be a hybrid inflator, in which case the gas-producing material 121 may include both compressed gas and pyrotechnic components. Additionally or alternatively, the gas-producing material 121 may comprise a dissociating material.

With the gas-producing material 121 of FIG. 2, the initiation assembly 100 deploys within milliseconds to produce heat that causes expansion of the gas-producing material 121. The result is a sudden pressure increase within the gas chamber 54. The pressure increase, or possibly just the shock wave induced by deployment of the initiator 104, dislodges the burst discs 78 to open the first and second exit orifices 70, 72. As the gaseous portion of the gas-producing material 121 flows out of the inflator 24, the liquid is vaporized to add to the volume of the first and second gas flows 94, 96. Thus, a considerable amount of gas can be produced by the inflator 24, despite its modest size.

Furthermore, the presence of a portion of the gas-producing material 121 in liquid form may be beneficial because the liquid will absorb heat as it vaporizes. Hence, the first and second gas flows 94, 96 will be comparatively cool, and therefore less likely to damage the inflatable curtain 10. The inflatable curtain 10 may therefore be made from a comparatively less heat-resistant and quite possibly cheaper material. For example, a thinner silicon coating for the fabric of the inflatable curtain 10 may be sufficient to protect the fabric from thermal damage.

The inflator 24 is comparatively inexpensive and easy to manufacture. According to one manufacturing method, the gas chamber 54 may first be formed through known methods. If desired, the gas chamber 54 may be provided as a single unitary piece, as depicted in FIG. 2. The gas-producing material 121 may be inserted through the fill port 116 prior to installation of the stopper 118. In the alternative, the gas-producing material may be cryogenically processed, i.e., frozen and compressed into solid form, and inserted through the initiator aperture 102 prior to installation of the initiation assembly 100. The initiation assembly 100 may be welded or otherwise firmly fixed in place to avoid escape of the gas-producing material 121 from the gas chamber 54.

In the alternative to one-piece construction, the gas chamber 54 may be formed as two separate pieces to facilitate the insertion of the burst discs 78, the initiation assembly 100, and the gas-producing material 121. For example, the first end 66 may be separated from the remainder of the gas chamber 54 by a radial seam (not shown), so that each of the first end 66 and the remainder of the gas chamber 54 forms a tube with a circular opening. The burst discs 78, the initiation assembly 100, and/or cryogenic material may easily be inserted into such circular openings and fixed in place. The first end 66 may then be attached, for example, through welding, to the remainder of the gas chamber 54.

Figure 3:
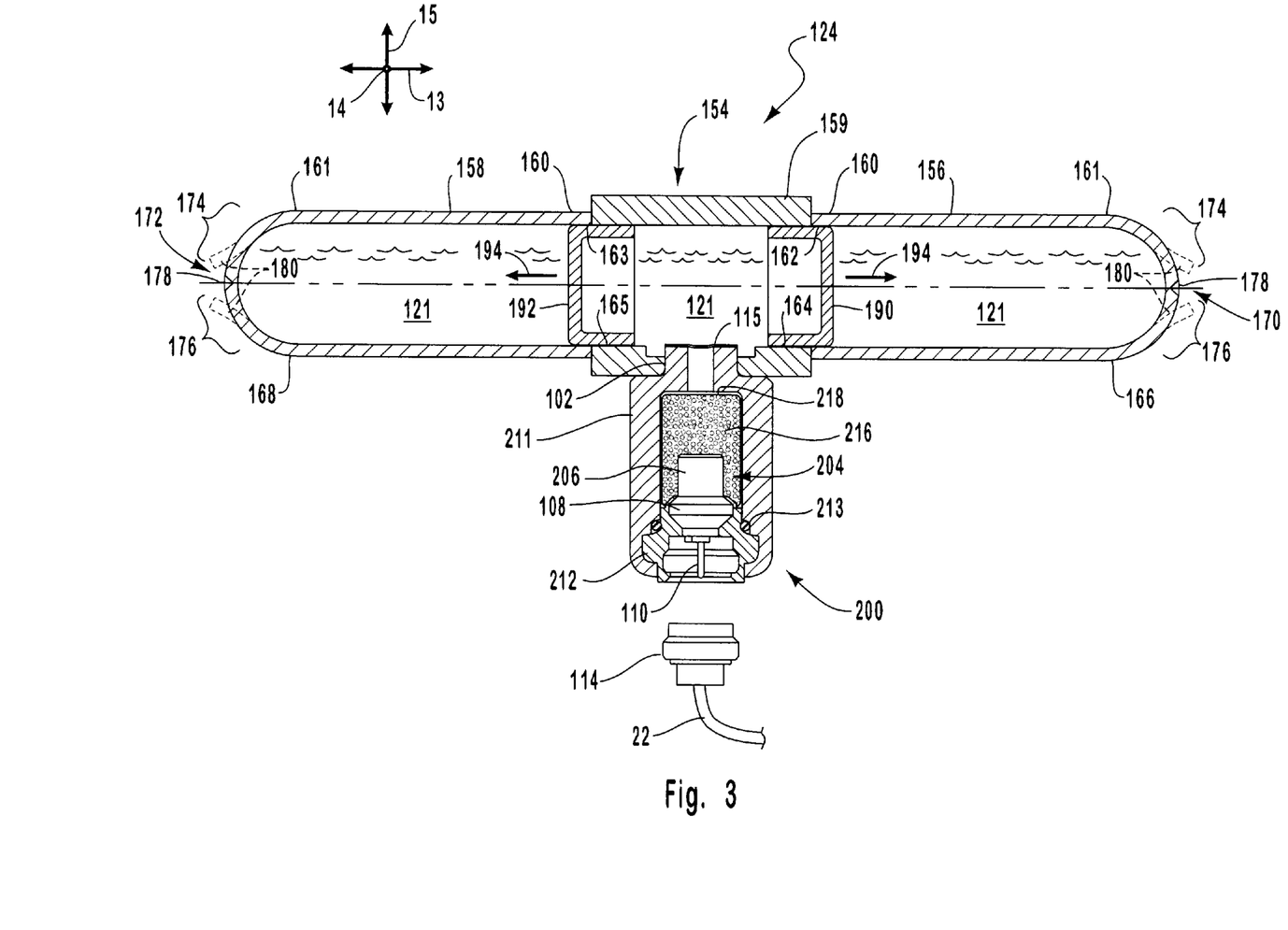
FIG. 3 is a side elevation, section view of an alternative embodiment of an inflator according to the invention.
Figure 4:
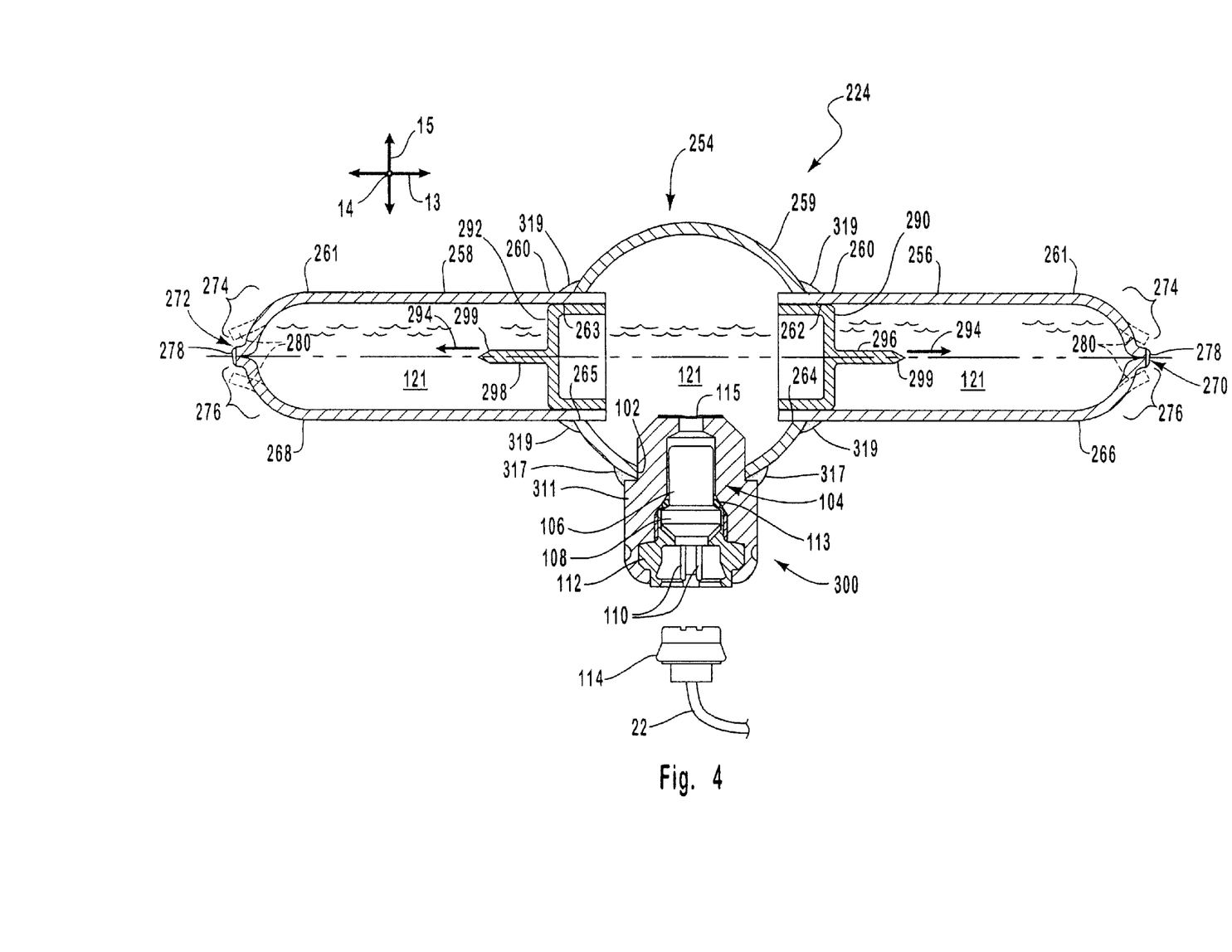
FIG. 4 is a side elevation, section view of another alternative embodiment of an inflator according to the invention.
Figure 5:
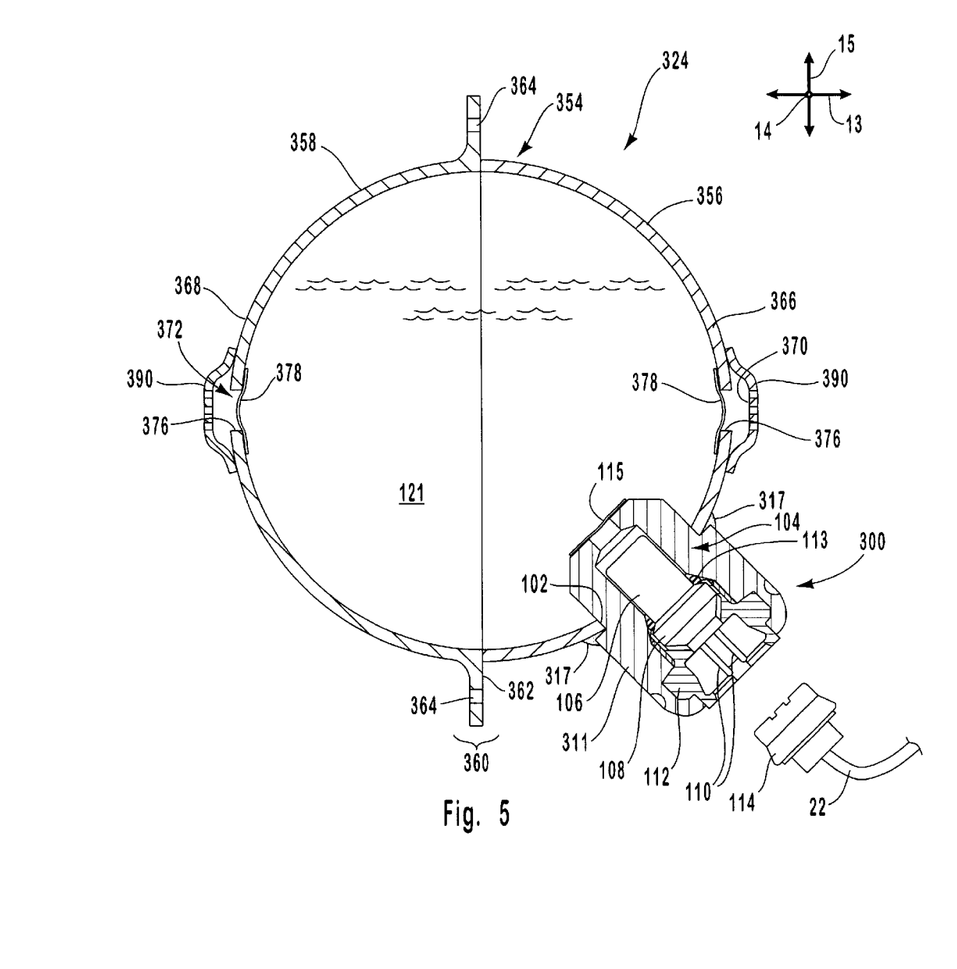
FIG. 5 is a side elevation, section view of yet another alternative embodiment of an inflator according to the invention.

Many other aspects of the inflator 24 may be varied to suit the geometry of the vehicle 12, the size and shape of the inflatable curtain 10, and the available manufacturing equipment. FIGS. 3 through 5 present alternative embodiments of dual flow inflators, each of which contains a number of variations from the inflator 24 of FIG. 2. These variations may be used in any combination, or in conjunction with other variations that will be recognized by those of skill in the art, to produce a larger number of embodiments of the invention than can be illustrated or specifically described herein.

Referring to FIG. 3, an inflator 124 according to one alternative embodiment of the invention is shown. The inflator 124 may have a gas chamber 154, and may be designed to be installed within inflation ports of an inflatable curtain, in much the same manner as the gas chamber 54 of FIG. 2. The inflation ports and attachment features have been omitted from FIG. 3 for clarity.

The gas chamber 154 of FIG. 3 may have a multi-part configuration designed for easy manufacturing and installation. More specifically, the gas chamber 154 may have a first vessel 156 and a second vessel 158, each of which has a generally tubular configuration. Additionally, the gas chamber 154 may have a bulkhead 159 that also has a generally tubular configuration. Each of the vessels 156, 158 may have an interior end 160 and an exterior end 161. The exterior ends 161 may be closed, with a flat circular, hemispherical, or otherwise dome-like configuration. By contrast, the interior end 160 of the first vessel 156 may have a first interior opening 162, and the interior end 160 of the second vessel 158 may have a second interior opening 163.

The bulkhead 159 may have a first aperture 164 shaped to match the interior end 160 of the first vessel 156 and a second aperture 165 shaped to match the interior end 160 of the second vessel 158. Preferably, the first and second apertures 164, 165 can be aligned with the interior ends 160 in such a manner that fluids can pass relatively freely between the first vessel 156, the second vessel 158, and the bulkhead 159. For example, the first and second apertures 164, 165 may be sized approximately the same as the inside diameters of the interior ends 160 so that the interior ends 160 can abut the apertures 164, 165 to form a continuous tubular shape.

As shown in FIG. 3, inertial welding may been used to affix the interior ends 160 to the bulkhead 169. More specifically, the first and second vessels 156, 158 may be spun with a desired rotational inertia and pressed against the bulkhead 159 to frictionally weld the interior ends 160 to the bulkhead 169, thereby curling the interior ends 160 somewhat. If desired, the apertures 164, 165 may also be sized to contain the interior ends 160, in which case a weld, interference fit, or the like may be used to keep the interior ends 160 seated firmly within the apertures 164, 165.

When assembled, the first and second vessels 156, 158 and the bulkhead 159 form the gas chamber 154. The gas chamber 154 may have a first end 166 located on the first vessel 156 and a second end 168 located on the second vessel 158. A first exit orifice 170 may be positioned on the first end 166, and a second exit orifice 172 may be positioned on the second end 168.

Like the exit orifices 70, 72 of FIG. 2, each of the exit orifices 170, 172 has an open configuration that permits gas flow and a sealed configuration, in which gas cannot escape through the exit orifices 170, 172. However, in place of the burst discs 78 and openings 76 of the inflator 24 of FIG. 1, each of the exit orifices 170, 172 may take the form of a frangible surface such as a scored surface 170, 172. Each of the scored surfaces 170, 172 has a first deformable portion 174, a second deformable portion 176, and a weakened region 178.

Each weakened region 178 may take the form of a score 178 formed in the surface of the first and second ends 166, 168. Each score 178 may be formed by gouging first and second ends 166, 168, for example, with a sharpened tool constructed of hard steel, tungsten carbide, diamond, or the like. The tool may be shaped to peel off a layer of the material of the first and second ends 166, 168; multiple operations may be used to remove the desired amount of material.

The scores 178 may take a wide variety of configurations. For example, each score 178 may simply comprise a single line disposed within the plane perpendicular to the transverse direction 15. Alternatively, a star-like shape with multiple intersecting scores (not shown) may be used. The following description assumes the use of a single line for each score 178, as depicted in FIG. 3. With a star-like shape, operation of the scores would be similar to that of the scores 178 of FIG. 3. Multiple wedge-shaped deformable portions would exist between the intersecting scores; each deformable portion would bend or "bloom" outward upon failure of the scores.

The depth of the score 178 should be selected such that the score 178 ruptures when the pressure within the gas chamber 154 reaches a predetermined threshold, or when the pressure shock within the gas chamber 154 reaches a predetermined threshold. A deeper score would produce an exit orifice 170 or 172 that opens in response to a lower pressure or shock. The scores 178 of the first and second scored surfaces 170, 172 may be an equal depth to ensure that the first and second scored surfaces 170, 172 open simultaneously, and that thrust neutrality is maintained. In the alternative, the scores 178 of the first and second scored surfaces 170, 172 may be varied in depth, length, width, or configuration to provide different timing and/or gas flow characteristics.

The first and second deformable portions 174, 176 may be first and second lips 174, 176 that are integrally formed with each other, on either side of the scores 178. When the scores 178 rupture, the lips 174, 176 may deflect outward somewhat to reach a deformed configuration 180, shown in phantom. In the deformed configuration 180, the lips 174, 176 are separated somewhat to provide an opening through which inflation gas can escape.

Indeed, in the deformed configuration 180, the lips 174, 176 perform the functions accomplished by the openings 76 and the gas guide diffusers 92 of FIG. 2. The lips 174, 176 may be configured to deflect such that an opening of the desired size is produced. For example, in order to form a larger opening, the lips 174, 176 may be made somewhat thinner than the surrounding portions of the vessels 156, 158. Alternatively, the lips 174, 176 may be notched, thermally treated, or otherwise processed to control the amount of deflection present in the deformed configuration 180, and hence, the size of the opening through which inflation gas flows.

In order to ensure that the first and second scored surfaces 170, 172 are opened completely and simultaneously, a first piston 190 may be disposed within the first vessel 156, and a second piston 192 may be disposed within the second vessel 158. Each of the pistons 190, 192 may have a generally cylindrical shape that engages the interior diameter of the associated vessel 156, 158 to restrict fluid passage across the pistons 190, 192. The pistons 190, 192 need not form a hermetic seal with the vessels 156, 158; rather, the pistons 190, 192 simply restrict fluid flow through the space between the pistons 190, 192 and the vessels 156, 158.

The inflator 124 may have an initiation assembly 200 installed in a manner similar to that of the initiation assembly 100 of FIG. 2. The initiation assembly 200 may be seated within an initiator aperture 102 formed in the bulkhead 159, and may be disposed almost entirely outside the bulkhead 159. Gas-producing material 121 may be stored within the gas chamber 154, as in FIG. 2. Of course, the gas-producing material 121 may include gaseous and/or liquid components, or may instead include a pyrotechnic material.

If desired, the initiation assembly 200 may be configured somewhat differently from the initiation assembly 100 of the previous embodiment. More specifically, the initiation assembly 200 may have an initiator 204 with a head 206, a body 108, and prongs 110 that receive an ignition signal. The initiator 200 may be retained by an initiator receptacle 211 and an initiator retention member 212. An o-ring 213 may form a substantially gas-tight seal between the initiator receptacle 211 and the initiator retention member 212.

The initiator receptacle 211 may have an enlarged interior cavity to contain a quantity of booster material 216, which may be disposed about the head 206. A dome 218 may encapsulate the booster material 216 and keep the booster material 216 in a comparatively tight arrangement about the head 206. Upon activation of the initiator 204, the booster material 216 may also ignite to intensify the thermal energy provided by the initiator 204. The dome 218 may be designed to rupture, or even disintegrate, upon activation of the initiator 204.

When the initiation assembly 200 deploys, the gas-producing material 121 between the pistons 190, 192 expands and presses the pistons 190, 192 outward, in the directions indicated by the arrows 194. The gas-producing material 121 between the first piston 190 and the first scored surface 170 and between the second piston 192 and the second scored surface 172 initially receives a comparatively smaller quantity of heat from the initiation assembly 200. Consequently, the pistons 190, 192 are driven outward, toward the scored surfaces 170, 172. As the pistons 190, 192 move, the gas-producing material 121 outside the pistons 190, 192 is compressed. The pressure increase and/or shock ruptures the scores 178 and presses the lips 174, 176 into the deformed configuration 180, thereby opening the scored surfaces 170, 172.

If one of the scored surfaces 170, 172 opens prior to the other, the pistons 190, 192 may ensure that sufficient pressure remains within the gas chamber 154 to open the remaining scored surface 170 or 172. More specifically, the tight fit of the pistons 190, 192 within the vessels 156, 158 limits the rate at which inflation gas is able to escape from between the pistons 190, 192. Hence, even when the pressure outside one of the pistons 190, 192 decreases in response to the rupture of the adjacent scored surface 170 or 172, gas continues to press the pistons 190, 192 outward to ensure that the remaining scored surface 170 or 172 is ruptured.

Furthermore, the pistons 190, 192 may generally restrict the rate at which inflation gases are able to escape the gas chamber 154. Thus, the pistons 190, 192 may also perform a part of the function carried out by the gas guide diffusers 92. Restriction of the flow rate of the inflation gases may help to prevent "bag slap," or injury to vehicle occupants as a result to overly rapid inflation of the inflatable curtain 10. Furthermore, the pistons 190, 192 may ensure that inflation gases are supplied to the inflatable curtain 10 over a long enough time period to keep the inflatable curtain 10 inflated during a prolonged accident such as a rollover.

The use of the pistons 190, 192 is optional; the inflator 124 may be configured to operate reliably without them. For example, through somewhat tight tolerancing of dimensions of the scores 178 or through the use of other pressure regulating mechanisms, full and substantially simultaneous opening of the first and second scored surfaces 170, 172 may be ensured.

The inflator 124 may be comparatively easily manufactured. The vessels 156, 158 may be initially separate from the bulkhead 159. The exterior ends 161 of the vessels 156, 158 may be scored through the use of an appropriate tool, as described above. Although the scores 178 are disposed on the outsides of the vessels 156, 158 in FIG. 3, scores may be formed on the interior surfaces of the vessels 156, 158, in the alternative or in addition to the scores 178 on the outsides.

The pistons 190, 192 and the gas-producing material 121 may then be easily inserted into the interior openings 162, 163 of the vessels 156, 158. Again, cryogenic methods may be used to compact the gas-producing material 121. Similarly, the apertures 164, 165 may aid in the installation and positioning of the initiation assembly 200 within the initiator aperture 102 of the bulkhead 159. After the gas-producing material 121, the pistons 190, 192, and the initiation assembly 200 have been installed, the interior ends 160 of the first and second vessels 156, 158 may be affixed to the bulkhead 159 in alignment with the first and second apertures 164, 165.

The vessels 156, 158 may be fixed in place within the bulkhead 159, for example, through the use of a method such as inertial welding. More specifically, as mentioned previously, the vessels 156, 158 may be rotated rapidly around the longitudinal axis 13, pressed against the bulkhead 159 in alignment with the apertures 164, 165, and permitted to stop rotating. The heat generated by frictional engagement of the interior ends 160 with the bulkhead 159 forms a weld between the vessels 156, 158 and the bulkhead 159.

Referring to FIG. 4, an inflator 224 according to another alternative embodiment of the invention is shown. The inflator 224 may have a gas chamber 254 and may be designed to be installed within inflation ports of an inflatable curtain, in much the same manner as the inflator 24 of FIG. 2. The inflation ports and attachment features have been omitted from FIG. 4 for clarity.

Like the gas chamber 154 of FIG. 3, the gas chamber 254 of FIG. 4 may have a multi-part configuration. The gas chamber 254 may have a first vessel 256 and a second vessel 258, each of which has a generally tubular configuration. Additionally, the gas chamber 254 may have a bulkhead 259 that has a generally spherical, rather than tubular, shape.

The spherical shape may permit the bulkhead 259 to hold a larger quantity of gas-producing material 121. Thus, the inflator 224 may be used to provide additional inflation gas, or in the alternative, the vessels 256, 258 may be made somewhat smaller because they need not hold the same quantity of gas-producing material. Hence, the choice of whether a spherical or tubular bulkhead is desired depends on the needed quantity of inflation gas as well as the space available for the inflator.

Like the vessels 156, 158 of FIG. 3, each of the vessels 256, 258 may have an interior end 260 and an exterior end 261. The exterior ends 261 may be closed, with a flat circular, hemispherical, or otherwise dome-like configuration. The interior end 260 of the first vessel 256 may have a first interior opening 262, and the interior end 260 of the second vessel 258 may have a second interior opening 263.

Similarly, the bulkhead 259 may have a first aperture 264 that receives the interior end 260 of the first vessel 256 and a second aperture 265 that receives the interior end 260 of the second vessel 258. The gas chamber 254 may have a first end 266 and a second end 268; a first exit orifice 270 may be positioned at the first end 266 and a second exit orifice 272 may be positioned at the second end 268. Like the exit orifices 70, 72 of FIG. 2 and the exit orifices 170, 172 of FIG. 3, the exit orifices 270, 272 may be frangible structures. However, instead of burst discs or scored surfaces, the exit orifices 270, 272 may take the form of compression closures.

A "compression closure" may be defined as an opening that has been closed, or nearly closed, through mechanical deformation of the material surrounding the opening. Thus, compression closures include openings that have been crimped, swaged, twisted, folded, or otherwise deformed into a closed position.

As shown in FIG. 4, the first and second exit orifices 270, 272 take the form of crimped openings 270, 272, or closures formed through the simple application of mechanical compression perpendicular to the axis of the opening. More particularly, each of the crimped openings 270, 272 may have a first deformable portion 274, a second deformable portion 276, and a weakened region 278.

The first and second deformable portions 274, 276 may take the form of lips 274, 276, somewhat similar to the lips 174, 176 of the previous embodiment. However, rather than being formed integrally in a closed position, the lips 274, 276 may be formed in an open position and closed in a subsequent crimping operation. The lips 274, 276 may, more specifically, be pressed together in the transverse direction 15. The weakened region 278 may take the form of a weld 278 used to hold the lips 274, 276 together and ensure that they are sealed.

In a manner similar to the previous embodiment, the weld 278 may rupture in response to a high pressure and/or pressure shock within the gas chamber 254. The lips 274, 276 may then open into the deformed configuration 280, shown in phantom, to permit inflation gas to escape the gas chamber 254. The compressive force applied to close the lips 274, 276 and the weld strength of the weld 278 may be selected to obtain a desired threshold pressure or shock. The compressive force and the weld strength may be toleranced somewhat tightly to ensure that the first and second crimped openings 270, 272 open substantially simultaneously.

The inflator 224 may have a first piston 290 and a second piston 292 disposed within the first and second vessels 256, 258 in a manner similar to the pistons 190, 192 of the previous embodiment. An initiation assembly 300 somewhat similar to that of FIG. 2 may be seated within an initiator aperture 102 of the bulkhead 259 to induce a rapid pressure rise between the pistons 290, 292. The initiation assembly 300 may differ from the initiation assembly 100 in that an initiator receptacle 311 of the initiation assembly 300 is shaped to fit partially within the bulkhead 259. Thus, the initiation assembly 300 protrudes from the bulkhead 259 by a comparatively smaller distance.

Like the pistons 190, 192, the pistons 290, 292 move outward, in the directions indicated by the arrows 294, upon activation of the initiation assembly 300. However, the pistons 290, 292 may be configured somewhat differently than the pistons 190, 192. More specifically, the first piston 290 may have a first puncture member 296, and the second piston 292 may have a second puncture member 298. The puncture members 296, 298 may be designed to physically contact the crimped openings 270, 272 when the pistons 290, 292 move to ensure that the crimped openings 270, 272 open completely.

The puncture members 296, 298 may each have a sharpened tip 299 that is inserted between the lips 274, 276 to wedge the lips 274, 276 apart, thereby inducing rupture of the welds 278. Further motion of the sharpened tips 299 through the crimped openings 270, 272 may spread the lips 274, 276 apart by a distance selected to permit the desired flow rate of inflation gas to flow through the crimped openings 270, 272. As with the previous embodiment, inflation gas may escape form between the pistons 290, 292 at a somewhat slower rate to flow out of the gas chamber 254 through the crimped openings 270, 272.

The inflator 224 may be manufactured in a manner similar to that of the inflator 124. More specifically, the vessels 256, 258 may be manufactured separately from the bulkhead 259. The exterior ends 261 of the vessels 256, 258 may initially be open, and may be pressed together through a crimping process carried out with the aid of a hydraulic press or the like.

The pistons 290, 292 and the gas-producing material 121 may then be inserted into the interior openings 262, 263 of the vessels 256, 258. Again, cryogenic methods may be used to compact the gas-producing material 121. The initiation assembly 300 may be installed in the initiator aperture 102 of the bulkhead 259. According to one example, the initiation assembly 300 may be welded in place via welds 317, as shown in FIG. 4.

After the gas-producing material 121, the pistons 290, 292, and the initiation assembly 300 have been installed, the interior ends 260 of the first and second vessels 256, 258 may be inserted into the first and second apertures 264, 265 of the bulkhead 259 and fixed in place with a method such as welding or interference fitting. In the exemplary embodiment of FIG. 4, welds 319 have been used to fix the interior ends 260 of the vessels 256, 258 in place within the bulkhead 259.

Referring to FIG. 5, an inflator 324 according to yet another alternative embodiment of the invention is shown. The inflator 324 may have a gas chamber 354 with a generally spherical shape. The gas chamber 354 may be installed within inflation ports of an inflatable curtain, in much the same manner as the inflators 24, 124, 224 of previous embodiments. In place of the clamps 64, some attachment mechanism (not shown) designed to connect the inlet ports 60, 62 to a spherical, rather than cylindrical, object may be used. In the alternative, the inflator 324 may be attached in an entirely different position than the position of the inflator 24 in FIG. 1. The inflator 324 may, for example, be readily used for front impact airbags positioned on the driver's side or the passenger's side.

The gas chamber 354 may have a first hemispherical portion 356 and a second hemispherical portion 358. The first and second hemispherical portions 356, 358 may be attached together at an equatorial region 360. The first and second hemispherical portions 356, 358 may, for example, be attached by fastening, welding, or the like. A mounting flange 362 may extend outward from the equatorial region 362. The mounting flange 362 may be integrally formed with the second hemispherical portion 358 as shown, or may be disposed on both hemispherical portions 356, 358, or may be a separate piece attached to the hemispherical portions 356, 358 at the equatorial region 360.

The mounting flange 362 may be used in place of the mounting brackets 26 to attach the inflator 324 to the vehicle 12. The mounting flange 362 may have a plurality of mounting holes 364 arrayed around its circumference so that fasteners (not shown) can be inserted through the mounting holes 364 and through aligned holes of a similar flange within the vehicle 12. Additionally or in the alternative, the mounting flange 362 may be used to affix the inlet ports 60, 62 to the inflator 324; external ring clamps or the like may be used to facilitate such attachment. As another alternative, the mounting flange 362 may be omitted entirely in favor of other forms of vehicle and/or inlet port attachment.

As with previous embodiments, the gas chamber 354 may have a first end 366 and a second end 368 disposed opposite the first end 366. Of course, in the embodiment of FIG. 5, the first and second ends 366, 368 are not disposed at the end of any tubular structure, but on opposite sides of the spherical shape of the gas chamber 354. The first end 366 may have a first exit orifice 370, and the second end 368 may have a second exit orifice 372. The first and second exit orifices 370, 372 may each have an open configuration that permits gas flow and a closed configuration that keeps gases from leaving the gas chamber 354.

The first and second exit orifices 370, 372 may be configured in a manner somewhat similar to the exit orifices 70, 72 of FIG. 2. More particularly, the first and second exit orifices 370, 372 may each have an opening 376 and a burst disc 378 that blocks the opening 376 in the closed configuration. As with the burst discs 78, the burst discs 378 may deflect in response to high pressure and/or pressure shock, and may then be ejected from the openings 376.

Burst disc retention members 390 may be positioned outward of the openings 376 to capture the burst discs 378 to prevent damage to the inflatable curtain 10. The burst disc retention members 390 may take the form of dome or plateau-shaped flanges with holes to permit gas flow through the burst disc retention members 390. In the alternative, the burst disc retention members 390 may have a mesh structure like that of the burst disc retention members 90 of FIG. 2.

As with the previous embodiments, the inflator 324 may have an initiator assembly 300 like that of the previous embodiment. The initiator assembly 300 may be positioned at the equatorial region 360, or may be located off-center as shown in FIG. 5 to avoid interference with the attachment of the first and second hemispherical portions 356, 358. In such a case, the initiation assembly 300 may be installed within an initiator aperture 102 of the first hemispherical portion 356. If desired, the initiator receptacle 311 of the initiation assembly 300 may be elongated somewhat to position the initiator 104 near the center of the gas chamber 354 to ensure that deployment of the initiator 104 causes substantially simultaneous opening of the first and second exit ports 370, 372.

As with previous embodiments, the gas-producing material 121 contained by the inflator 324 may include a gas and/or a liquid. Alternatively, a pyrotechnic material could be used. The initiation assembly 300 may heat the gas-producing material 121 to increase the pressure within the gas chamber 354. The first and second exit ports 370, 372 may open in response to the pressure increase, thereby inflating the inflatable curtain 10 in a manner similar to that of the inflator 24 of FIG. 2.

The inflator 324 may also be manufactured comparatively easily. The first and second hemispherical portions 356, 358 may first be formed through methods known in the art. The burst disc retention members 390 may be attached, for example, by welding, to the first and second ends 366, 368. The burst discs 378, the initiation assembly 300, and the gas-producing material 121 may then be installed via the open ends of the hemispherical portions 356, 358. If desired, the gas-producing material 121 may be inserted in cryogenic form.

As with the previous embodiment, the initiation assembly 300 may be attached to the first hemispherical portion via welds 317. The first and second hemispherical portions 356, 358 may then be attached together, for example, through a method such as welding, brazing, or mechanical fastening.

The dual flow inflators of the present invention provide a significant advancement in airbag design. Through the simplification of mounting features and process, the elimination of redundant initiators, and the refinement of exit orifice designs, airbag systems maybe produced and installed with less time and expense. Furthermore, the use of multiple exit ports and axial flow exit orifices enables a single inflator to rapidly and uniformly provide inflation gas for multiple protection zones.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. An inflator for a vehicular airbag system, the inflator comprising:
    a gas chamber having a longitudinal axis, the gas chamber comprising a first exit orifice oriented to provide a first gas flow out of the gas chamber, substantially parallel to the longitudinal axis, and a second exit orifice oriented to provide a second gas flow out of the gas chamber in a direction substantially opposite the first gas flow, the first and second exit orifices each having an open configuration and a sealed configuration; and
    an initiator oriented nonparallel to the longitudinal axis and disposed in communication with the gas chamber to induce the first gas flow through the first exit orifice and the second gas flow through the second exit orifice.

2. The inflator of claim 1, wherein the first and second exit orifices are sized to eject the first and second gas flows substantially equally such that substantially no thrust is exerted on the inflator along the longitudinal axis.

3. The inflator of claim 1, wherein the first and second exit orifices are sized differently such that the first and second gas flows contain different amounts of gas.

4. The inflator of claim 1, wherein each of the first and second exit orifices comprises a frangible structure selected from the group consisting of burst discs, scored surfaces, and compression closures.

5. The inflator of claim 4, wherein the frangible structures are burst discs, the inflator further comprising a burst disc retention member disposed outside each of the burst discs to prevent ejection of the burst discs from the first and second exit orifices.

6. The inflator of claim 5, wherein the burst discs are shaped to uncover the first and second exit orifices in response to a pressure shock induced by activation of the initiator.

7. The inflator of claim 1, wherein the gas chamber comprises a substantially tubular shape, wherein the first and second exit orifices are disposed at opposite ends along the longitudinal axis of the substantially tubular shape.

8. The inflator of claim 1, further comprising:
    a first piston disposed generally between the initiator and the first exit orifice, the first piston moving toward the first exit orifice in response to a pressure increase initiated by the initiator to move the first exit orifice to the open configuration; and
    a second piston disposed generally between the initiator and the second exit orifice, the second piston moving toward the second exit orifice in response to a pressure increase initiated by the initiator to move the second exit orifice to the open configuration.

9. The inflator of claim 8, further comprising:
    a first puncture member disposed between the first piston and the first exit orifice such that the first piston actuates the first puncture member to impact the first exit orifice upon activation of the initiator; and
    a second puncture member disposed between the second piston and the second exit orifice such that the second piston actuates the second puncture member to impact the second exit orifice upon activation of the initiator.

10. The inflator of claim 1, further comprising a booster material positioned proximate the initiator to expedite the first and second gas flows.

11. The inflator of claim 1, further comprising a gas-producing material that substantially provides the first and second gas flows through operation of the initiator, independent of any additional initiator.

12. The inflator of claim 11, wherein the gas-producing material is selected to be insertable into the chamber as a cryogenic solid.

13. The inflator of claim 11, wherein the gas-producing material comprises compressed gas.

14. The inflator of claim 13, wherein the gas-producing material further comprises a liquid that vaporizes in response to decreasing pressure within the gas chamber to supplement the first and second gas flows.

15. The inflator of claim 13, wherein the gas-producing material further comprises a pyrotechnic gas generant that combusts to supplement the first and second gas flows.

16. The inflator of claim 11, wherein the gas producing material comprises a dissociating gas.

17. The inflator of claim 11, wherein the gas-producing material comprises a pyrotechnic gas generant that combusts to provide the first and second gas flows, wherein the pyrotechnic gas generant is selected from the group consisting of gaseous generants, liquid generants, solid generants, and combinations of two or more solid, liquid, or gaseous generants.

18. The inflator of claim 1, wherein the gas chamber is an integrally formed, unitary body.

19. The inflator of claim 1, wherein the gas chamber comprises:
    a first vessel having an interior end with a first interior opening and an exterior end on which the first exit orifice is disposed;
    a second vessel having an interior end with a second interior opening and an exterior on which the second exit orifice is disposed; and
    a bulkhead with a first aperture shaped to communicate with the interior end of the first vessel and a second aperture sized to communicate with the interior end of the second vessel, the second aperture positioned opposite the first aperture.

20. The inflator of claim 1, wherein the gas chamber comprises a first end on which the first outlet orifice is disposed and a second end on which the second outlet orifice is disposed, wherein the first end is shaped to be inserted into a first inlet port of an inflatable curtain of the vehicular airbag system, and wherein the second end is shaped to be inserted into a second inlet port of the inflatable curtain.

21. The inflator of claim 1, wherein the first and second exit orifices are positioned to direct the first and second gas flows into an inflatable cushion of a type selected from the group consisting of a driver's side airbag, a passenger's side airbag, an overhead airbag, and a knee bolster.

22. The inflator of claim 1, wherein the gas chamber comprises an elongated shape with a substantially circular cross section.

23. The inflator of claim 1, wherein the gas chamber comprises a substantially spherical shape.

24. An inflator for a vehicular airbag system, the inflator comprising:
    a gas chamber having a longitudinal axis, the gas chamber comprising a first end with a first exit orifice and a second end with a second exit orifice displaced from the first orifice along the longitudinal axis, the first and second exit orifices each having an open configuration and a sealed configuration;
    an initiator receptacle formed separately from and attached to the gas chamber; and
    an initiator seated in the initiator receptacle, displaced from the longitudinal axis, to produce heat between the first and second ends to induce a first gas flow through the first exit orifice and a second gas flow through the second exit orifice.

25. The inflator of claim 24, wherein each of the first and second exit orifices comprises a frangible structure selected from the group consisting of burst discs, scored surfaces, and compression closures.

26. The inflator of claim 24, wherein the first exit orifice is oriented to inject the first gas flow substantially parallel to the longitudinal axis, and wherein the second exit orifice is oriented to inject the second gas flow in a direction substantially opposite the first gas flow.

27. An inflator for a vehicular airbag system, the inflator comprising:
    a first vessel having an interior end with a first interior opening and an exterior end with a first exit orifice that opens in response to activation of the inflator to permit pressurized gas to escape from the first vessel;
    a second vessel having an interior end with a second interior opening and an exterior end with a second exit orifice that opens in response to activation of the inflator to permit pressurized gas to escape from the second vessel;
    a bulkhead with a first aperture shaped to communicate with the interior end of the first vessel and a second aperture sized to communicate with the interior end of the second vessel, the second aperture positioned opposite the first aperture; and
    an initiator oriented nonparallel to a longitudinal axis extending through the first and second orifices.

28. The inflator of claim 27, further comprising a gas-producing material of a type selected to be insertable into the first interior opening of the first vessel as a cryogenic solid, the gas-producing material producing gas in response to activation of the initiator.

29. The inflator of claim 27, wherein the bulkhead comprises a substantially tubular shape.

30. The inflator of claim 27, wherein the bulkhead comprises a substantially spherical shape.

31. The inflator of claim 27, wherein the initiator is in communication with the bulkhead and retained by an initiator aperture of the bulkhead.

32. The inflator of claim 27, wherein the first vessel is shaped to be inserted into a first inlet port of an inflatable curtain of the vehicular airbag system, and wherein the second vessel is shaped to be inserted into a second inlet port of the inflatable curtain.

33. An inflator for a vehicular airbag system, the inflator comprising:
    a first hemispherical portion with a first exit orifice having an open configuration and a sealed configuration;
    a second hemispherical portion with a second exit orifice positioned opposite the first exit orifice, the second exit orifice having an open configuration and a sealed configuration; and
    an initiator oriented nonparallel to a longitudinal axis extending through the first and second orifices and disposed in communication with a cavity formed by the first and second hemispherical portions to induce a first gas flow through the first exit orifice and a second gas flow through the second exit orifice.

34. The inflator of claim 33, wherein the first and second hemispherical portions are integrally formed with each other.

35. The inflator of claim 33, wherein the first and second hemispherical portions are separately formed and affixed together.

36. The inflator of claim 33, further comprising a mounting flange extending outward from an equatorial region between the first and second hemispherical portions.

37. The inflator of claim 33, wherein the first hemispherical portion is shaped to be inserted into a first inlet port of an inflatable curtain of the vehicular airbag system, and wherein the second hemispherical portion is shaped to be inserted into a second inlet port of the inflatable curtain.

38. The inflator of claim 33, wherein the first and second exit orifices are positioned to inflate a driver's side airbag.

39. The inflator of claim 33, wherein the first and second exit orifices are positioned to inflate a passenger's side airbag.

40. The inflator of claim 33, wherein the first and second exit orifices are positioned to inflate an overhead airbag.

41. The inflator of claim 33, wherein the first and second exit orifices are positioned to inflate a knee bolster.

42. A method for manufacturing an inflator for a vehicular airbag system, the method comprising:
   providing a gas chamber having a first end and a second end opposite the first end;
   providing an initiator receptacle;
   forming a first exit orifice in the first end, the first exit orifice having a sealed configuration and an open configuration;
   forming a second exit orifice in the second end, the second exit orifice having a sealed configuration and an open configuration;
   providing an initiator;
   attaching the initiator receptacle to the gas chamber;
   installing the initiator in the initiator receptacle such that the initiator is displaced from a longitudinal axis extending through the first and second orifices to position the initiator in communication with a portion of the gas chamber between the first and second ends;
   inserting gas-producing material into the gas chamber; and
   sealing the chamber with the first and second exit orifices in the sealed configuration to prevent escape of the gas-producing material until the initiator has been activated.

43. The method of claim 42, wherein providing a gas chamber comprises providing an integrally-formed, unitary body.

44. The method of claim 42, wherein providing a gas chamber comprises providing:
   a first vessel having an interior end with a first interior opening and an exterior end on which the first exit orifice is disposed;
   a second vessel having an interior end with a second interior opening and an exterior on which the second exit orifice is disposed; and
   a bulkhead with a first aperture shaped to communicate with the interior end of the first vessel and a second aperture sized to communicate with the interior end of the second vessel, the second aperture positioned opposite the first aperture.

45. The method of claim 42, wherein forming the first and second exit orifices comprises forming frangible structures selected from the group consisting of burst discs, scored surfaces, and compression closures.

46. The method of claim 45, wherein the frangible structures are burst discs, the method further comprising:
   providing two burst disc retention members; and
   disposing a burst disc retention member outside each of the burst discs to prevent ejection of the burst discs from the first and second exit orifices.

47. The method of claim 45, wherein forming frangible structures comprises providing burst discs configured to unblock the first and second exit orifices in response to pressure shock.

48. The method of claim 42, wherein inserting the gas-producing material into the gas chamber comprises disposing the gas-producing material to substantially provide first and second gas flows through the first and second exit orifices through operation of the initiator, independent of any additional initiator.

49. The inflator of claim 48, wherein the gas-producing material is selected to be insertable into the chamber as a cryogenic solid.

50. A method for inflating an inflatable curtain of a vehicular airbag system, the vehicular airbag system comprising an inflator having an initiator, a first end with a first exit orifice disposed proximate a first inlet port of the inflatable curtain, and a second end with a second exit orifice disposed proximate a second inlet port of the inflatable curtain, wherein each of the first and second exit orifices have an open configuration and a sealed configuration, the method comprising:
   activating the initiator, wherein the initiator is oriented nonparallel to a longitudinal axis extending through the first and second exit orifices;
   moving the first exit orifice from the sealed configuration to the open configuration to permit a first gas flow to flow into the inflatable curtain from the inflator through the first exit orifice; and
   moving the second exit orifice from the sealed configuration to the open configuration to permit a second gas flow to flow into the inflatable curtain from the inflator through the second exit orifice.

51. The method of claim 50, wherein moving the first and second orifices from the sealed configuration to the open configuration comprises activating a single initiator of the inflator to induce the first and second gas flows.

52. The method of claim 50, wherein the first gas flow is injected from the inflator substantially parallel to a longitudinal axis of the inflator, and wherein the second gas flow is injected from the inflator in a direction substantially opposite the first gas flow.

53. The method of claim 50, wherein moving the first and second exit orifices from the sealed configuration to the open configuration comprises removing a burst disc from each of the first and second exit orifices.

54. The method of claim 53, wherein removing a burst disc from each of the first and second exit orifices comprises receiving a pressure shock in each burst disc and deflecting each burst disc in response to the pressure shock to enable passage of each burst disc through the corresponding exit orifice.

55. The method of claim 50, wherein moving the first and second exit orifices from the sealed configuration to the open configuration comprises splitting scores extending along the first end and the second end.

56. The method of claim 50, wherein moving the first and second orifices from the sealed configuration to the open configuration comprises splitting welds extending along the first end and the second end.

57. A method for manufacturing an inflator for a vehicular airbag system, the method comprising:

providing a gas chamber having a first hemispherical portion and a second hemispherical portion;

forming a first exit orifice in the first hemispherical portion, the first exit orifice having a sealed configuration and an open configuration;

forming a second exit orifice in the second hemispherical portion, the second exit orifice positioned opposite the first exit orifice and having a sealed configuration and an open configuration; and attaching an initiator to one of the hemispherical portions such that the initiator is oriented nonparallel to a longitudinal axis extending through the first and second orifices.

58. The method of claim 57, wherein providing the gas chamber comprises:

attaching the first and second hemispherical portions together to provide a substantially spherical shape.

59. The method of claim 57, further comprising forming a mounting flange that extends outward from an equatorial region between the first and second hemispherical portions.

* * * * *